United States Patent
Kim

(10) Patent No.: US 12,354,209 B2
(45) Date of Patent: Jul. 8, 2025

(54) APPARATUS AND METHOD FOR GENERATING TEXTURE MAP FOR 3D WIDE AREA TERRAIN

(71) Applicant: ELECTRONICS AND TELECOMMUNICATIONS RESEARCH INSTITUTE, Daejeon (KR)

(72) Inventor: Hye-Sun Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 276 days.

(21) Appl. No.: 18/084,214

(22) Filed: Dec. 19, 2022

(65) Prior Publication Data
US 2023/0419586 A1    Dec. 28, 2023

(30) Foreign Application Priority Data
Jun. 24, 2022    (KR) .................. 10-2022-0077576

(51) Int. Cl.
G06T 15/04    (2011.01)
G06T 7/11    (2017.01)
(Continued)

(52) U.S. Cl.
CPC .............. *G06T 15/04* (2013.01); *G06T 7/11* (2017.01); *G06T 7/50* (2017.01); *G06V 10/56* (2022.01); *G06T 2207/10024* (2013.01)

(58) Field of Classification Search
None
See application file for complete search history.

(56) References Cited

U.S. PATENT DOCUMENTS

| 10,796,496 B2 | 10/2020 | Kim et al. |
| 2019/0164351 A1 | 5/2019 | Kim et al. |

(Continued)

FOREIGN PATENT DOCUMENTS

| KR | 10-2019-0060228 | 6/2019 |
| KR | 10-2020-0083130 | 7/2020 |
| WO | 2015/127246 | 8/2015 |

OTHER PUBLICATIONS

Han et al., Scalable point cloud meshing for image based large-scale 3D modeling, Dec. 2019, 1-9 (Year: 2019).*

(Continued)

*Primary Examiner* — Robert J Craddock
(74) *Attorney, Agent, or Firm* — KILE PARK REED & HOUTTEMAN PLLC

(57) ABSTRACT

Disclosed herein are an apparatus and a method for generating a texture map for a three-dimensional (3D) wide area terrain. The method for generating a texture map for a 3D wide area terrain includes acquiring input images, obtained by capturing a reconstruction target terrain at multiple views, and a camera parameter corresponding to the input images, partitioning the reconstruction target terrain into tiles of a uniform size, reconstructing a tile-based mesh based on information about regions corresponding to respective partitioned tiles, the input images, and the camera parameter, and reconstructing a tile-based texture map based on the input images, the camera parameter, and the tile-based mesh.

20 Claims, 14 Drawing Sheets

(51) Int. Cl.
*G06T 7/50* (2017.01)
*G06V 10/56* (2022.01)

(56) References Cited

U.S. PATENT DOCUMENTS

2020/0211256 A1 7/2020 Kim et al.
2022/0020206 A1 1/2022 Redshaw

OTHER PUBLICATIONS

Fausto Bernardini et al., "High-Quality Texture Reconstruction from Multiple Scans", IEEE Transactions on Visualization and Computer Graphics, Oct. 1, 2001, pp. 1-14.

* cited by examiner

APPARATUS AND METHOD FOR GENERATING TEXTURE MAP FOR 3D WIDE AREA TERRAIN

CROSS REFERENCE TO RELATED APPLICATION

This application claims the benefit of Korean Patent Application No. 10-2022-0077576, filed Jun. 24, 2022, which is hereby incorporated by reference in its entirety into this application.

BACKGROUND OF THE INVENTION

1. Technical Field

The following embodiments generally to technology for automatically generating a texture map for a three-dimensional (3D) wide area terrain mesh reconstructed using multi-view images.

2. Description of the Related Art

Realistic terrain mesh/texture reconstructed using a realistic image is utilized as essential basic data in fields in which 3D terrain data is utilized, such as digital clones, drones' autonomous flight, realistic Virtual Reality (VR) content creation.

For this, terrain reconstruction technology for automatically generating 3D mesh/texture information using multi-view images performs a process of estimating images or sensor location/posture information of Light Detection and Ranging (LIDAR) or the like, meshing 3D shape information of terrain using the estimated information, selecting an optimal image segment from among input multi-view images, and mapping the optimal image segment to texture.

However, because conventional technology has been developed based on a narrow area such as a building or an object, a serious error occurs when mesh/texture is reconstructed based on a wide area terrain. That is, it is impossible to process an image captured to reconstruct a wide area terrain or LIDAR scan data at one time due to the large volume thereof. Further, when a wide area terrain is formed in a single entire mesh, it is difficult to handle the wide area terrain, thus making it difficult to perform rendering and interaction thereon at a subsequent application step.

For this, a tiling process of partitioning the entire terrain into tiles of a suitable size is required as an essential process of reconstructing a wide area terrain. However, when a texture map is generated using the conventional technology without change, processing is performed on each of the tiles, and thus problems, such as visibility check errors between tiles and separation attributable to the difference between texture colors, occur.

SUMMARY OF THE INVENTION

An embodiment is intended to reconstruct mesh/texture without errors based on multi-view images for a wide area terrain.

An embodiment is intended to partition a wide area terrain into tiles, thus preventing visibility check errors between tiles from occurring when reconstructing and generating mesh/texture.

An embodiment is intended to partition a wide area terrain into tiles, thus continuously and smoothly connecting tiles without causing separation attributable to the color difference between tiles when reconstructing and generating mesh/texture.

In accordance with an aspect of the present disclosure, there is provided an apparatus for generating a texture map for a three-dimensional (3D) wide area terrain, including memory configured to store at least one program, and a processor configured to execute the program, wherein the program is configured to perform acquiring input images, obtained by capturing a reconstruction target terrain at multiple views, and a camera parameter corresponding to the input images, partitioning the reconstruction target terrain into tiles of a uniform size, reconstructing a tile-based mesh based on information about regions corresponding to respective partitioned tiles, the input images, and the camera parameter, and reconstructing a tile-based texture map based on the input images, the camera parameter, and the tile-based mesh.

The program may be configured to further perform selecting an input image to be used for each tile from among the input images using the camera parameter, wherein reconstructing the tile-based mesh is performed based on the selected input image.

The program may be configured to perform, in reconstructing the tile-based texture map, checking visibility for each face included in the tile-based mesh.

The program may be configured to further perform generating a global depth map for each of the input images with respect to an entire mesh in which tile-based meshes are aggregated, and perform, in checking the visibility, determining visibility for each face using the global depth map.

The program may be configured to further perform, in checking the visibility, determining whether a ray, generated based on a camera parameter of an input image corresponding to a face included in the tile-based mesh, first intersects the corresponding face.

The program may be configured to further perform, in reconstructing the tile-based texture map, selecting an input image from which a texture segment to be mapped for each face is to be extracted.

The program may be configured to further perform, in reconstructing the tile-based texture map, correcting a difference between texture map colors of neighboring faces of the mesh, and correcting the difference between the texture map colors may include determining first texture color correction values of vertices located at a boundary between texture patches, and determining a second texture color correction value of a vertex located in an internal area of the corresponding texture patch by interpolating the first texture color correction values depending on a distance.

Each of the first texture color correction values may be obtained by subtracting a current texture color value of the vertex, which is a projected color value of an input image selected as texture, from a color correction target value that is an average of projected color values of the input images.

In accordance with another aspect of the present disclosure, there is provided a method for generating a texture map for a three-dimensional (3D) wide area terrain, including acquiring input images, obtained by capturing a reconstruction target terrain at multiple views, and a camera parameter corresponding to the input images, partitioning the reconstruction target terrain into tiles of a uniform size, reconstructing a tile-based mesh based on information about regions corresponding to respective partitioned tiles, the input images, and the camera parameter, and reconstructing a tile-based texture map based on the input images, the camera parameter, and the tile-based mesh.

The method may further include selecting an input image to be used for each tile from among the input images using the camera parameter, wherein reconstructing the tile-based mesh may be performed based on the selected input image.

Reconstructing the tile-based texture map may include checking visibility for each face included in the tile-based mesh.

The method may further include generating a global depth map for each of the input images with respect to an entire mesh in which tile-based meshes are aggregated, wherein checking the visibility may include determining visibility for each face using the global depth map.

Checking the visibility may further include determining whether a ray, generated based on a camera parameter of an input image corresponding to a face included in the tile-based mesh, first intersects the corresponding face.

Reconstructing the tile-based texture map may further include selecting an input image from which a texture segment to be mapped for each face is to be extracted.

Reconstructing the tile-based texture map may further include correcting a difference between texture map colors of neighboring faces of the mesh, and correcting the difference between the texture map colors may include determining first texture color correction values of vertices located at a boundary between texture patches, and determining a second texture color correction value of a vertex located in an internal area of the corresponding texture patch by interpolating the first texture color correction values depending on a distance.

Each of the first texture color correction values may be obtained by subtracting a current texture color value of the vertex, which is a projected color value of an input image selected as texture, from a color correction target value that is an average of projected color values of the input images.

In accordance with a further aspect of the present disclosure, there is provided a method for generating a texture map for a three-dimensional (3D) wide area terrain, including acquiring input images, obtained by capturing a reconstruction target terrain at multiple views, and a camera parameter corresponding to the input images, partitioning the reconstruction target terrain into tiles of a uniform size, selecting an input image to be used for each tile from among the input image, using the camera parameter, reconstructing tile-based meshes based on information about regions corresponding to respective partitioned tiles, the selected input images, and the camera parameter, generating a global depth map for each of the input images based on an entire mesh in which tile-based meshes are aggregated, and reconstructing a tile-based texture map based on the input images, the camera parameter, the tile-based meshes, and the global depth map.

Reconstructing the tile-based texture map may include checking visibility for each face included in the tile-based mesh, reconstructing the tile-based texture map, selecting an input image from which a texture segment to be mapped for each face is to be extracted, and correcting a difference between texture map colors of neighboring faces of the mesh.

Checking the visibility may include at least one of determining visibility for each face using the global depth map, or determining whether a ray, generated based on a camera parameter of an input image corresponding to a face included in the tile-based mesh, first intersects the corresponding face, or a combination thereof.

Correcting the difference between the texture map colors may include determining first texture color correction values of vertices located at a boundary between texture patches, and determining a second texture color correction value of a vertex located in an internal area of the corresponding texture patch by interpolating the first texture color correction values depending on a distance, wherein each of the first texture color correction values may be obtained by subtracting a current texture color value of the vertex, which is a projected color value of an input image selected as texture, from a color correction target value that is an average of projected color values of the input images.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
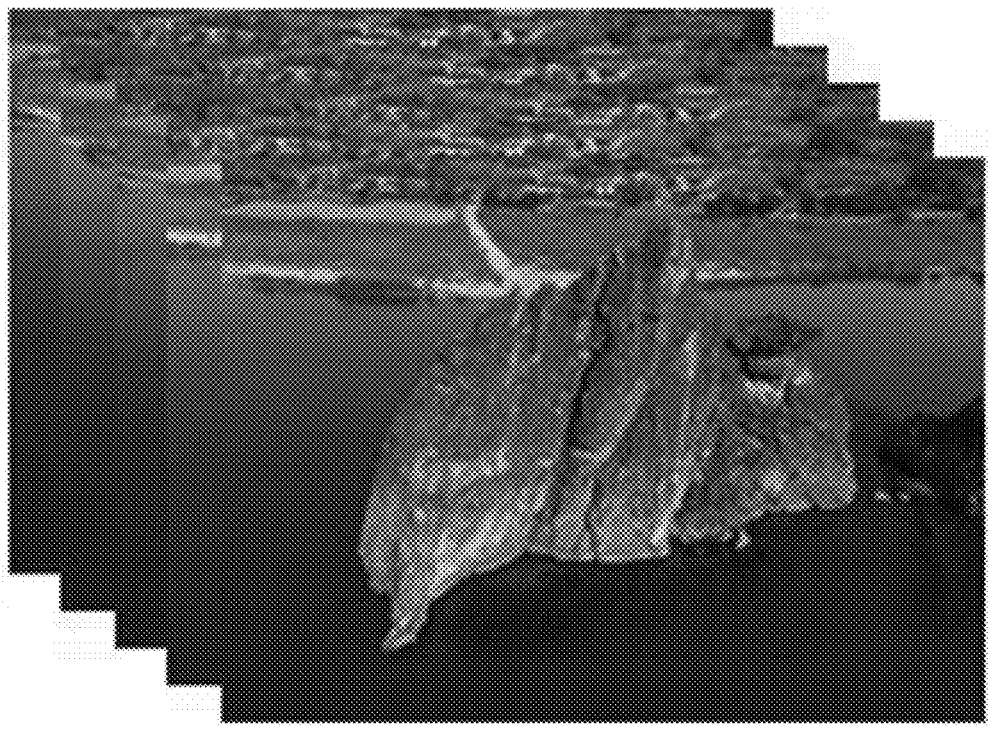
FIGS. 1 to 3 are diagrams illustrating an example of a typical method for automatically generating a texture map.

Advantages and features of the present disclosure and methods for achieving the same will be clarified with reference to embodiments described later in detail together with the accompanying drawings. However, the present disclosure is capable of being implemented in various forms, and is not limited to the embodiments described later, and these embodiments are provided so that this disclosure will be thorough and complete and will fully convey the scope of the present disclosure to those skilled in the art. The present disclosure should be defined by the scope of the accompanying claims. The same reference numerals are used to designate the same components throughout the specification.

It will be understood that, although the terms "first" and "second" may be used herein to describe various components, these components are not limited by these terms. These terms are only used to distinguish one component from another component. Therefore, it will be apparent that a first component, which will be described below, may alternatively be a second component without departing from the technical spirit of the present disclosure.

The terms used in the present specification are merely used to describe embodiments, and are not intended to limit the present disclosure. In the present specification, a singular expression includes the plural sense unless a description to the contrary is specifically made in context. It should be understood that the term "comprises" or "comprising" used in the specification implies that a described component or step is not intended to exclude the possibility that one or more other components or steps will be present or added.

Unless differently defined, all terms used in the present specification can be construed as having the same meanings as terms generally understood by those skilled in the art to which the present disclosure pertains. Further, terms defined in generally used dictionaries are not to be interpreted as having ideal or excessively formal meanings unless they are definitely defined in the present specification.

Hereinafter, an apparatus and a method for generating a texture map for a three-dimensional (3D) wide area terrain according to embodiments will be described in detail with reference to FIGS. 1 to 29.

Figure 2:
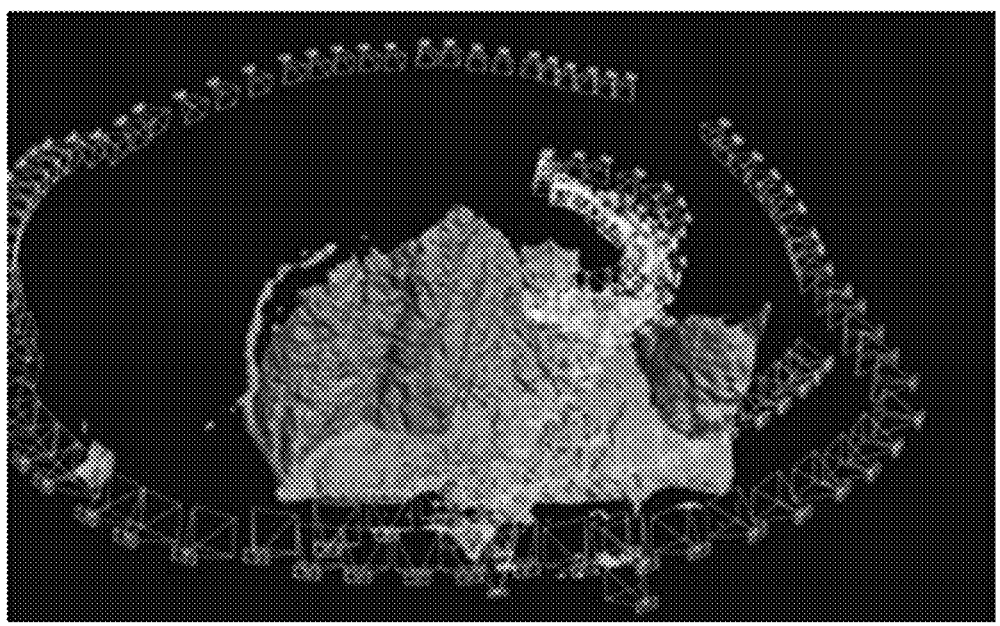
Figure 3:
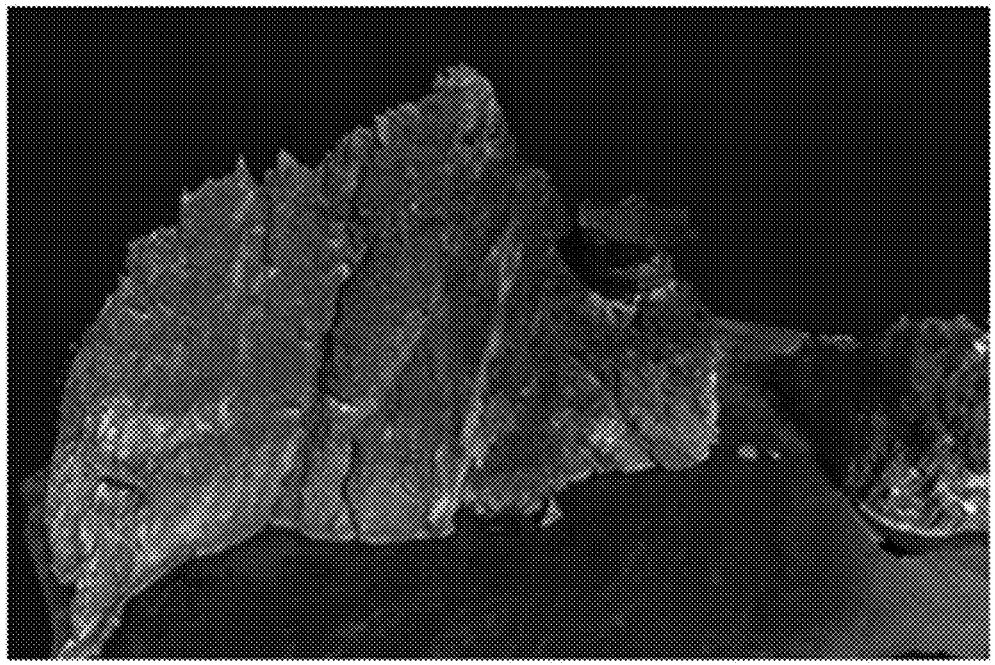

FIGS. 1 to 3 are diagrams illustrating an example of a typical method for automatically generating a texture map.

As multiple two-dimensional (2D) multi-view images, such as those illustrated in FIG. 1, are input, parameters such as location/posture information of cameras or sensors respectively corresponding to the multiple 2D multi-view images illustrated in FIG. 2 are estimated, and the 3D shape of the terrain is meshed using the parameters. Thereafter, as illustrated in FIG. 3, mapping of texture to an optimal image segment selected from among the input images is performed.

In this case, when the optimal image segment is selected in order to automatically generate a texture map, an operation of projecting respective faces of a 3D mesh reconstructed using the camera parameter information of the input images onto the respective input images, selecting the most suitable image segment, and storing the selected image segment as a texture map is performed.

Figure 4:
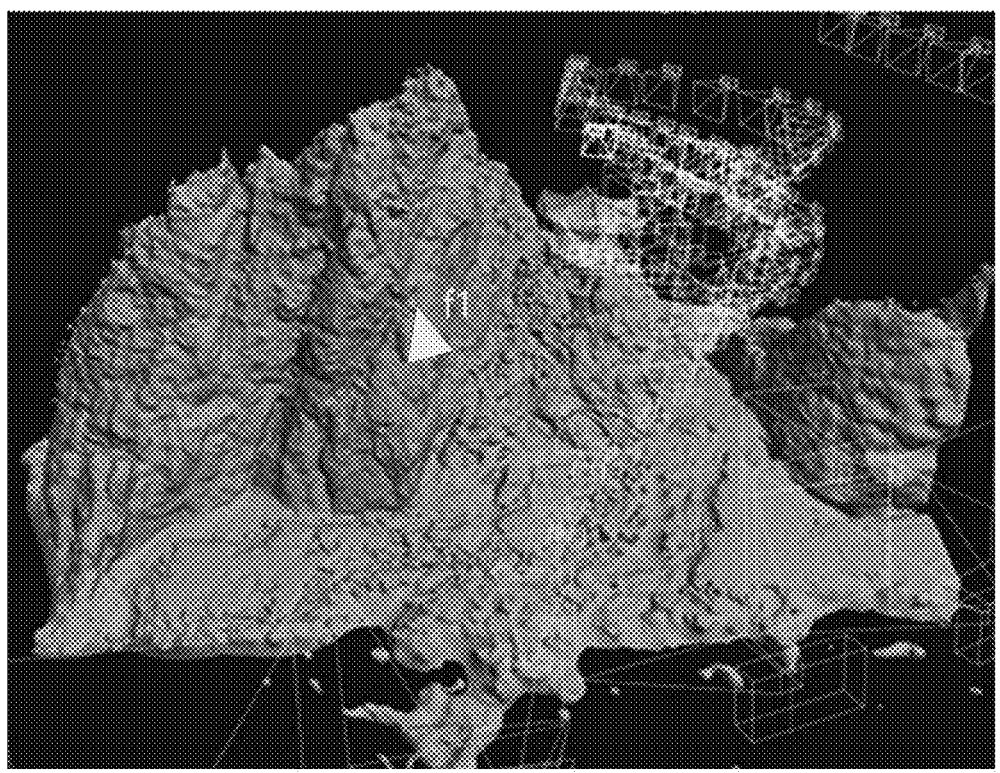
FIGS. 4 and 5 are diagrams for explaining an example of a process of projecting a triangular face of a mesh onto a two-dimensional (2D) input image.
Figure 5:
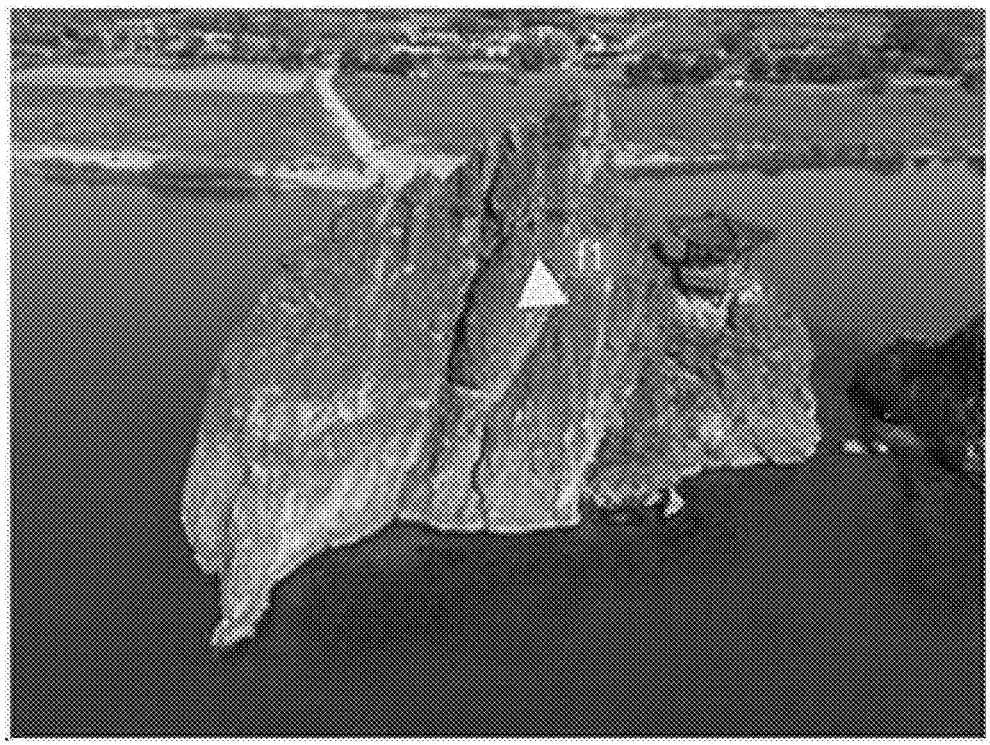

FIGS. 4 and 5 are diagrams for explaining an example of a process of projecting a triangular face of a mesh onto a two-dimensional (2D) input image.

All of input images such as those illustrated in FIG. 5 are projected on the triangular face f1 of the mesh such as that illustrated in FIG. 4, and items, such as whether the face f1 is hidden, the quality of projection, and balance with surrounding faces, are evaluated as scores. Further, an input image gaining the highest score as a result of the evaluation may be selected as the texture map of the face f1, and an image segment, in an area corresponding to the face f1, in the selected input image is stored.

Here, there are many cases where multiple faces included in the mesh are selected as segments of different input images. In this case, there occurs a phenomenon in which colors of texture maps between neighboring faces are not smoothly connected due to the difference between the color senses of input images, thus deteriorating connectivity between the faces. In the prior art, in order to prevent this phenomenon, the colors of texture maps of neighboring faces are corrected by performing a repetitive operation of reducing the difference between color senses of the texture maps of the neighboring faces.

Figure 6:
FIGS. 6 and 7 are diagrams illustrating an example of correction of texture map colors.
Figure 7:
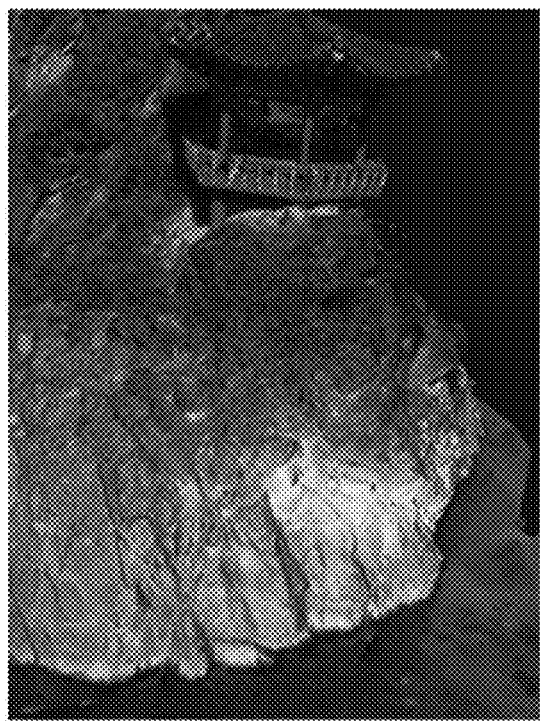

FIGS. 6 and 7 are diagrams illustrating an example of correction of texture map colors.

Texture discontinuity caused by the difference between the color senses of an input image occurs, as illustrated in FIG. 6, and a texture map may be corrected through a color sense correction operation, as shown in FIG. 7.

However, typical automatic texture map generation technology has been developed based on a narrow area, such as a building or an object, and thus a serious error occurs when mesh/texture is reconstructed based on a wide area terrain.

That is, because images, captured to reconstruct the wide area terrain, or LIDAR scan data has an excessively large volume, it is impossible to process the images or the scan data at one time.

Further, when the entire wide area terrain is generated as a single mesh, it is difficult to handle the mesh. That is, it is difficult to perform rendering and interaction on the single entire mesh at a subsequent application step.

For this operation, in order to reconstruct a wide area terrain, a tiling procedure for partitioning the entire terrain into tiles of a suitable size is essentially required.

Figure 8:
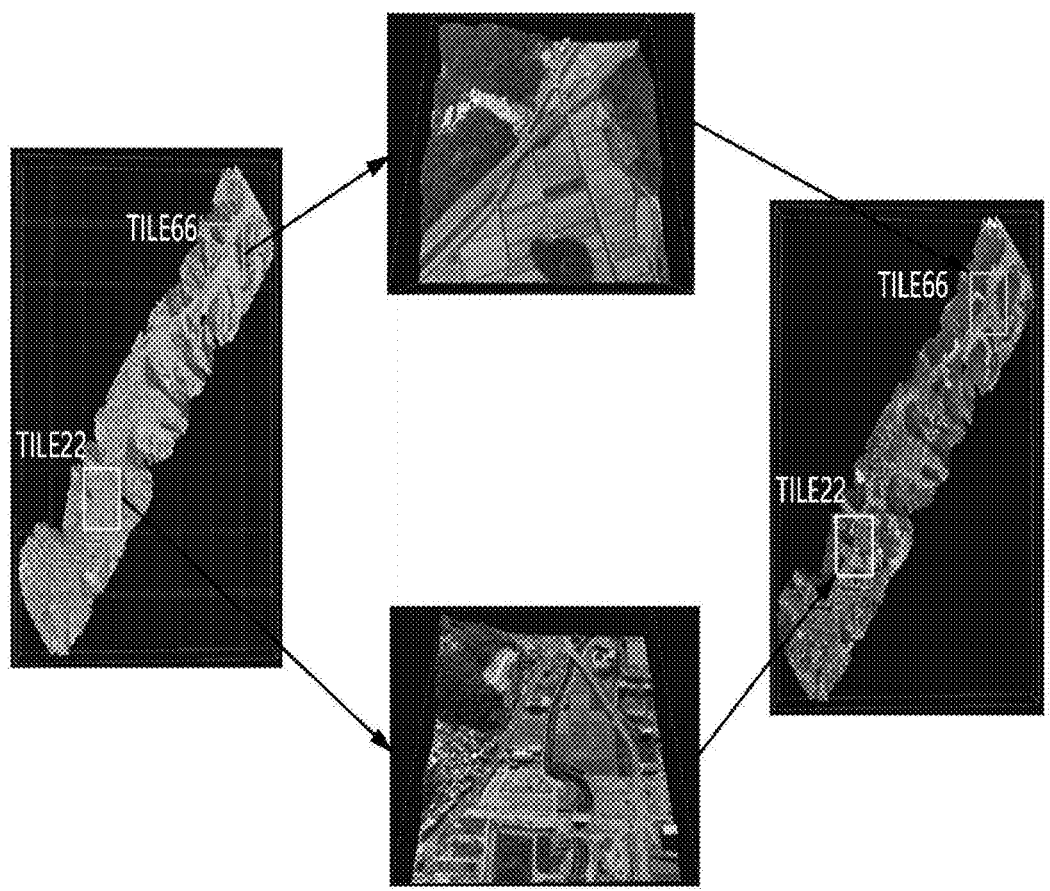
FIG. 8 is a diagram for explaining an example of a process of generating texture for a tiled wide area terrain.

FIG. 8 is a diagram for explaining an example of a process of generating texture for a tiled wide area terrain.

Referring to FIG. 8, a wide area terrain may be partitioned into 8×8 tile regions, and mesh/texture reconstruction for respective tiles may be independently processed, as in the case of tile 66 and tile 22, and results of processing may be integrated with each other, and thus mesh/texture may be reconstructed.

However, when the conventional technology is utilized without change, the following two errors may occur during the generation of a texture map.

First, when an image is selected, visibility check errors between tiles may occur.

Figure 9:
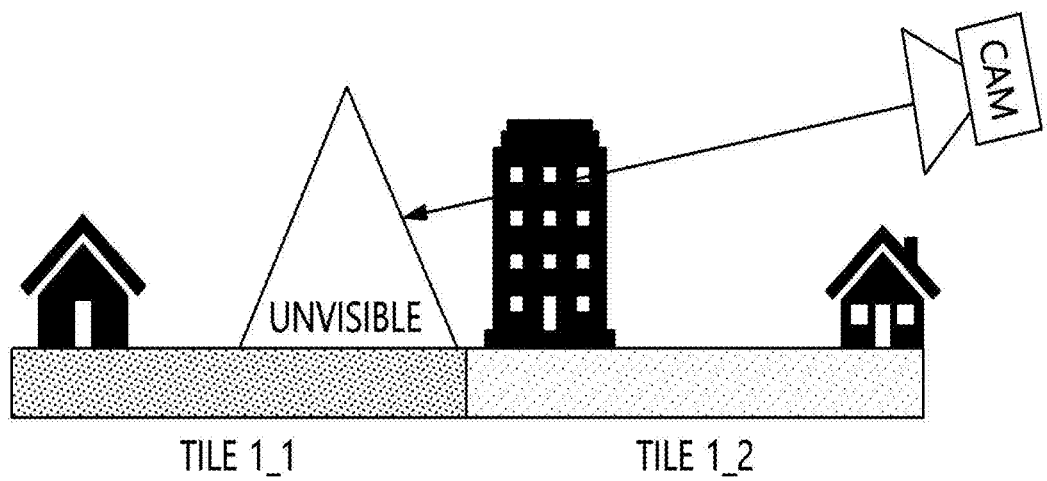
FIGS. 9 and 10 are diagrams illustrating an example of occurrence of visible errors upon generating a tile-based texture map.
Figure 10:
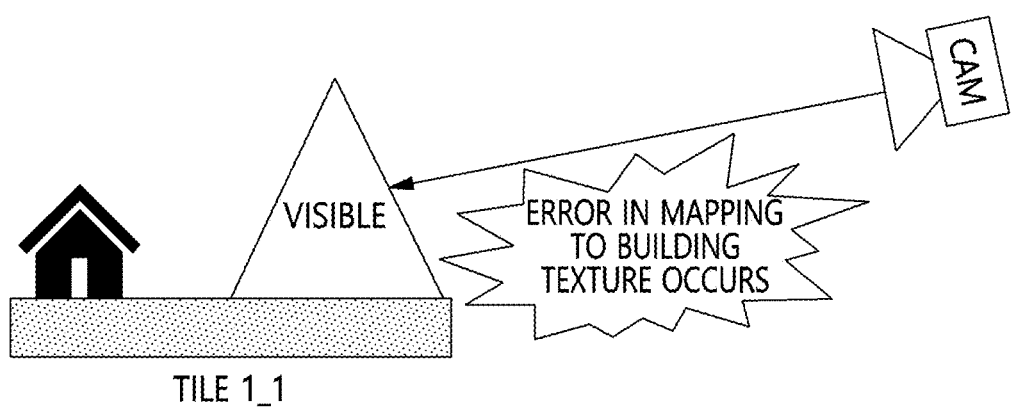

FIGS. 9 and 10 are diagrams illustrating an example of occurrence of visible errors upon generating a tile-based texture map.

As shown in FIG. 9, a mountain region, which is invisible due to the location and orientation of a camera CAM when a region corresponding to Tile 1_1 and a region corresponding to Tile 1_2 are simultaneously processed, is checked to be visible when only Tile 1_1 is processed, and thus an error in which building texture of the image is mapped to the mountain region may occur.

Next, a problem such as separation attributable to the difference between texture colors of tiles may occur.

Figure 11:
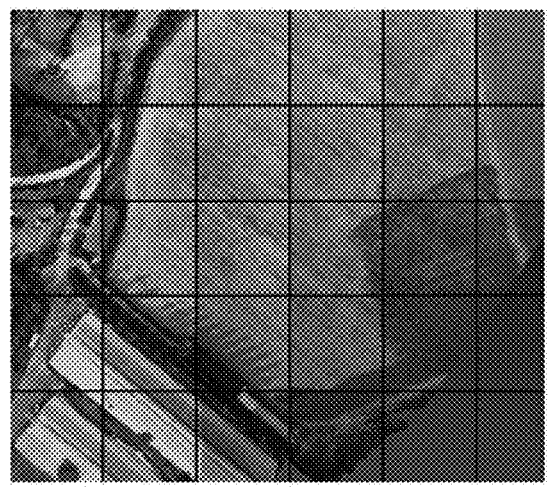
FIGS. 11 and 12 are diagrams illustrating an example of occurrence of errors related to a color difference upon generating a tile-based texture map.
Figure 12:

FIGS. 11 and 12 are diagrams illustrating an example of occurrence of errors related to color differences upon generating a tile-based texture map.

As illustrated in FIG. 11, after a texture map is generated on a tile basis, color senses of texture maps only between neighboring faces in respective tiles are corrected, and thus separation attributable to the difference between texture colors may occur between respective tiles, as illustrated in FIG. 12.

Therefore, an embodiment is intended to propose an apparatus and a method for generating a terrain texture map, which allow tiles to be smoothly connected without causing visibility check errors and color separation errors when multi-view images are received, a large-scale terrain is partitioned into tiles, and mesh/texture is reconstructed and generated.

Figure 13:
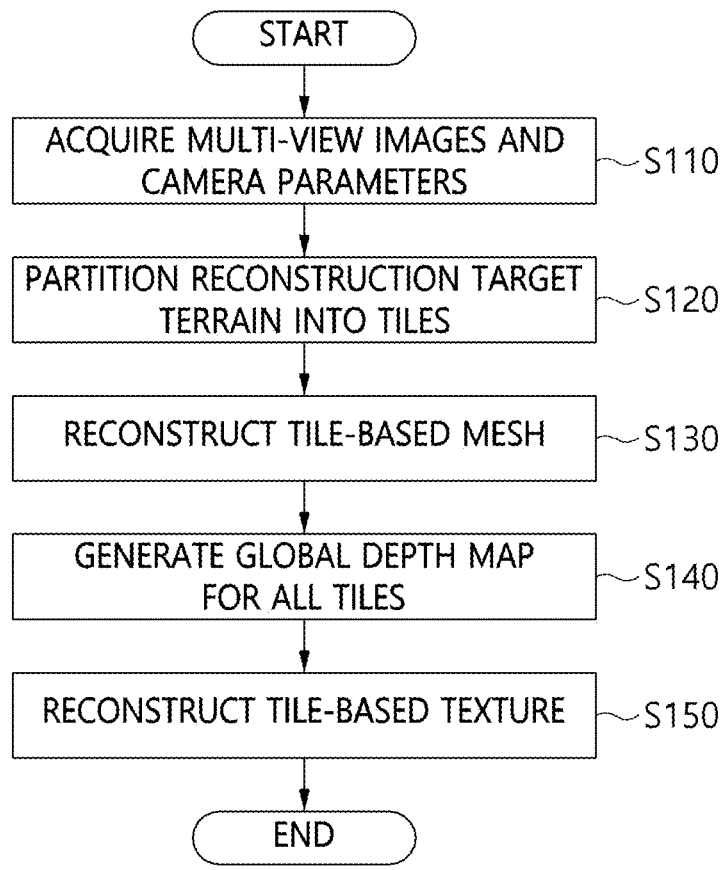
FIG. 13 is a flowchart for explaining a method for generating a texture map for a 3D wide area terrain according to an embodiment.

FIG. 13 is a flowchart for explaining a method for generating a texture map for a 3D wide area terrain according to an embodiment.

Referring to FIG. 13, the method for generating a texture map for a 3D wide area terrain according to an embodiment may include step S110 of acquiring input images, obtained by capturing a reconstruction target terrain at multiple views, and camera parameters corresponding thereto, step S120 of partitioning the reconstruction target terrain into tiles of a uniform size, step S130 of reconstructing a tile-based mesh based on information about regions corresponding to respective partitioned tiles, the input images and the camera parameters, and step S150 of reconstructing a tile-based texture map based on the input images, the camera parameters, and the tile-based mesh.

Here, step S110 of acquiring the input images, obtained by capturing the reconstruction target terrain at multiple views, and camera parameters corresponding thereto, it may be difficult to process images at one time because the number of images increases as the target area is wider.

For this, in an embodiment, step S120 of partitioning the reconstruction target terrain into tiles of a uniform size may be performed. That is, the reconstruction target terrain may be partitioned into multiple processable tiles having a uniform size.

Here, for respective tiles, only essential input images required for processing may be selected from among all input images. That is, only input images including the corresponding tile regions may be selected for respective tiles by excluding input images farther away from the tiles or input images facing other directions using the camera parameters of the input images. In this way, the number of input images required for processing on a tile basis decreases. Therefore, even if any image captured from a very wide area is input, the target area needs only to be suitably partitioned into tiles, and thus a theoretically infinitely wide area terrain may also be processed.

Meanwhile, the method for generating a texture map for a 3D wide terrain according to an embodiment may further include step S140 of generating global depth maps for respective input images from the entire mesh in which tile-unit meshes are aggregated.

Here, the generated global depth maps may be stored as a file, and may be utilized as principal data for providing global visibility information for the entire mesh at step S150 of reconstructing the tile-based texture map.

Figure 14:
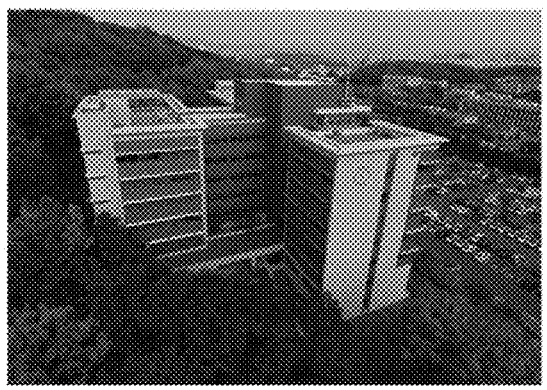
FIGS. 14 and 15 are diagrams illustrating examples of a depth map generated for an input image.
Figure 15:
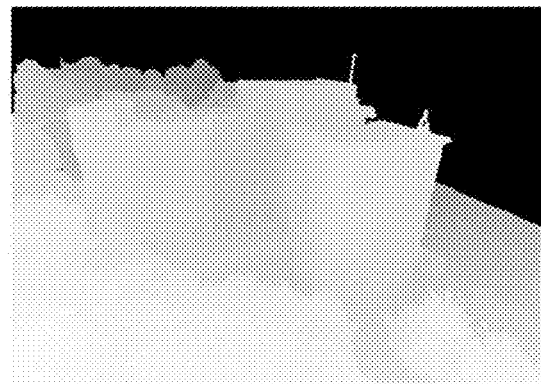

FIGS. 14 and 15 are diagrams illustrating examples of a depth map generated for an input image.

That is, the input image illustrated in FIG. 14 may be generated as a global depth map for the entire mesh generated based on camera parameters of the input image, as shown in FIG. 15.

Here, the depth map may store separation distance values of respective pixels of the image from the camera, and respective depth values may be depicted as monochrome brightness values.

Figure 16:
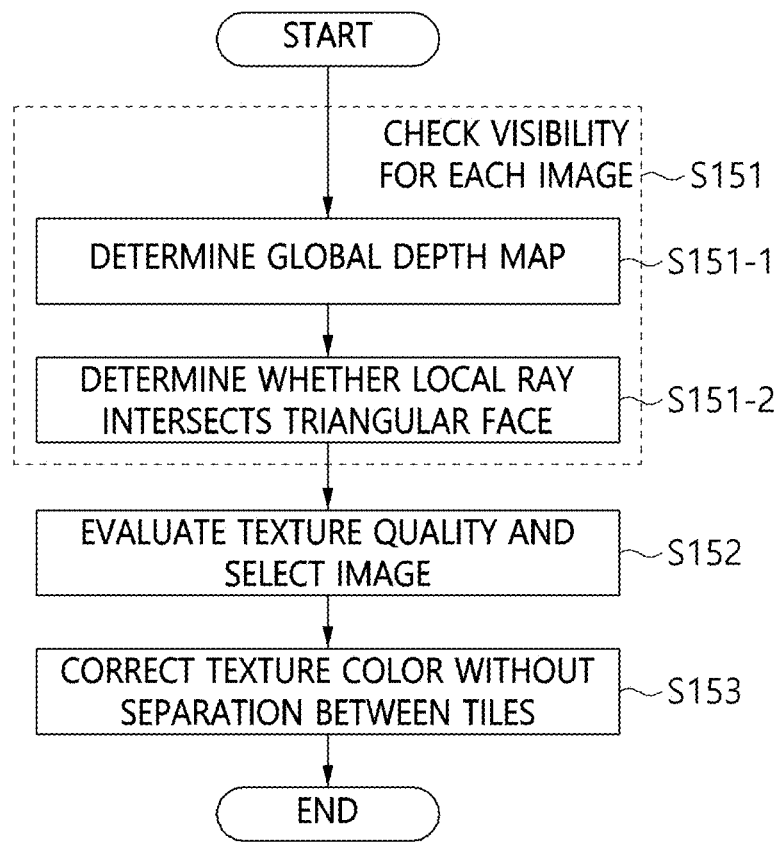
FIG. 16 is a flowchart for explaining the step of reconstructing a tile-based texture map according to an embodiment.

FIG. 16 is a flowchart for explaining the step of reconstructing a tile-based texture map according to an embodiment.

Referring to FIG. 16, S150 of reconstructing the tile-based texture map according to an embodiment may include step S151 of checking visibility for each face included in a tile-based mesh, step S152 of selecting an input image from which a texture segment to be mapped to each face is to be extracted, and step S153 of correcting the difference between texture map colors of the neighboring faces of the mesh.

Here, step S151 of checking visibility for each face included in the tile-based mesh is intended to check whether an object is satisfactorily seen without being hidden by each image for each triangular face of the mesh, and may include step S151-1 of determining visibility for each face using the global depth map.

Here, because the global depth map also includes depth information of an additional tile mesh, which does not belong to the corresponding tile, it may be suitable for checking the entire global visibility.

Here, step S151 of checking visibility for each face included in the tile-based mesh may further include step S151-2 of determining whether a local ray, generated based on the camera parameters of the input image corresponding to faces on a tile basis, intersects the corresponding face without being hidden by other faces.

Here, at step S151-2, additional mesh information other than the corresponding tile cannot be known, and thus visibility may be checked locally only within the corresponding tile. However, by means of this, visibility check errors occurring due to a limitation in depth map resolution may be more precisely checked once again.

Figure 17:
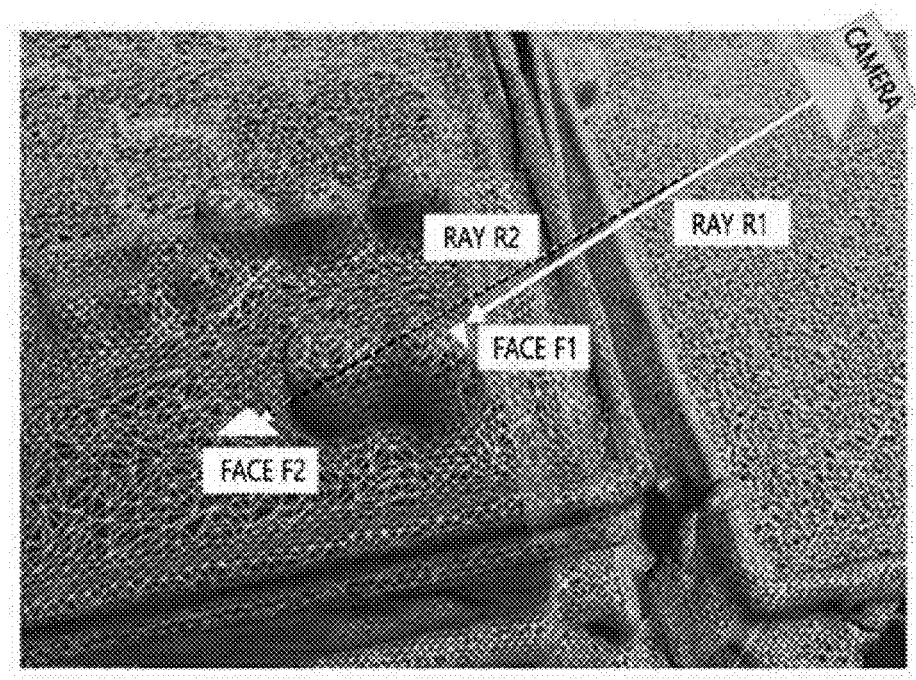
FIG. 17 is a diagram illustrating an example indicating whether camera rays intersect faces according to an embodiment.

FIG. 17 is a diagram illustrating an example indicating whether camera rays intersect faces according to an embodiment.

Referring to FIG. 17, it can be seen that, when a ray r1 generated based on the camera parameters of an image is caused to intersect a face f1, the ray r1 first intersects the face f1, thus securing visibility without causing hiding.

On the other hand, when a ray r2 generated based on the camera parameters of the image is caused to intersect a face f2, the ray r2 is hidden by other faces before intersecting the face f2, and is then invisible by the camera.

The above-described step S151 of checking visibility for each face included in the tile-based mesh may use together a method using the global depth map, as in the case of step S151-1, and a ray-triangular intersection method that is locally performed, but is precise, as in the case of step S151-2, thus enabling a precise visibility check to be performed while preventing global visibility check errors even if the texture map is partitioned into tiles and locally processed.

Figure 18:
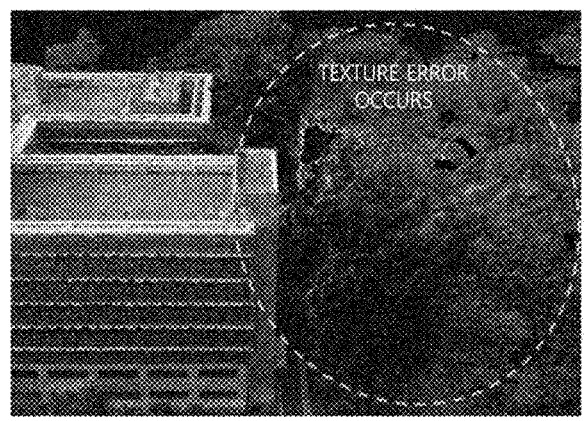
FIGS. 18 and 19 are diagrams illustrating examples of states before and after the step of checking visibility for each face included in a tile-based mesh is performed according to an embodiment.
Figure 19:

FIGS. 18 and 19 are diagrams illustrating examples of states before and after the step of checking visibility for each face included in a tile-based mesh is performed according to an embodiment.

FIG. 18 illustrates a reconstructed image in which a texture error occurs due to a visibility error, and FIG. 19 illustrates a reconstructed image after visibility for each face included in a tile-based mesh is checked according to an embodiment, wherein it can be seen that texture error is corrected.

Meanwhile, at step S152 of selecting the input image from which a texture segment to be mapped to each face is to be extracted, when the corresponding face is projected onto a camera parameter, texture quality in the input image is evaluated. That is, in the case where the face is projected, it may be determined that the best quality is obtained when the face is largely, clearly, and vertically viewed. The corresponding input image is selected as texture when the face is smoothly connected to neighboring faces.

Furthermore, at step S153 of correcting the difference between the texture map colors of the neighboring faces of the mesh according to the embodiment, color differences that occurs due to differences between capturing environments or camera settings when the neighboring faces of the mesh select different images as textures may be corrected.

Here, the correction of the difference between the texture map colors is performed using the vertex colors of the faces. Here, because the vertex colors are represented to be added to the colors of the texture map at the corresponding location when the final mesh/texture is 3D graphically rendered, the effect of correcting the colors of the texture map may be obtained.

Figure 20:
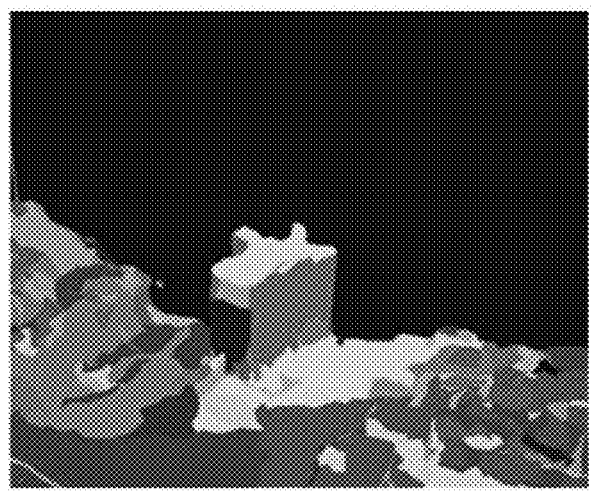
FIGS. 20 to 22 are diagrams illustrating an example of a process of reconstructing and generating a texture map by selecting an optimal image for each face according to an embodiment.
Figure 21:
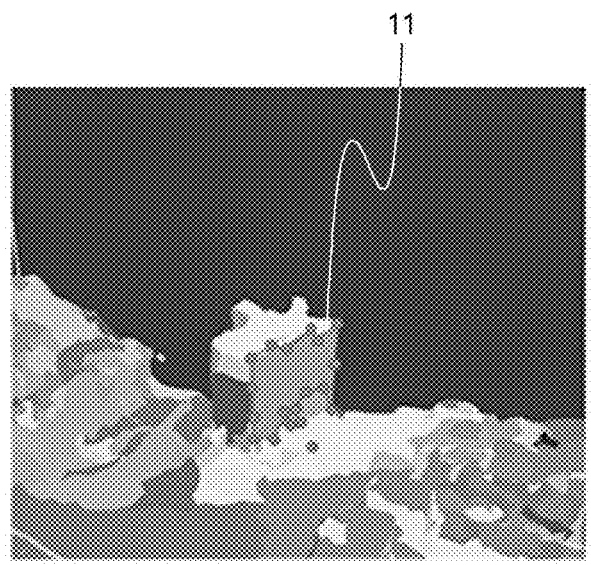
Figure 22:
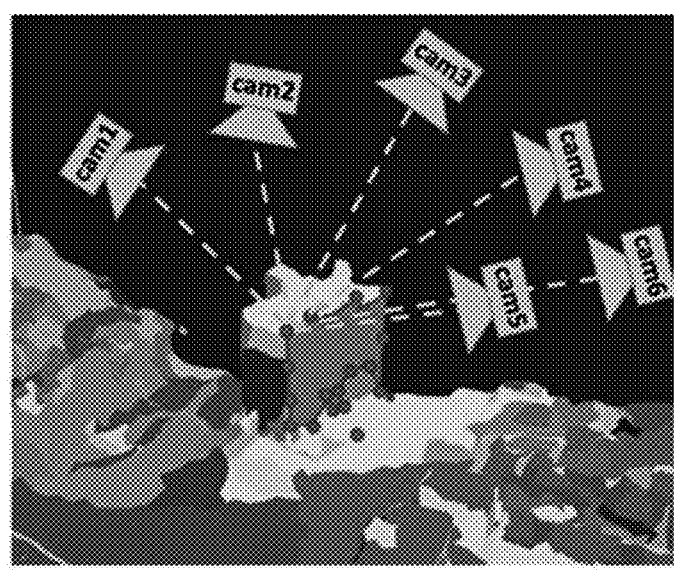

FIGS. 20 to 22 are diagrams illustrating a process of reconstructing and generating a texture map by selecting an optimal image for each face according to an embodiment.

Referring to FIG. 20, multiple small patches in which neighboring faces select the same image and form the same group are illustrated. Although not illustrated in the drawing, the small texture patches may be represented by unique colors so as to be distinguished from each other.

However, stains attributable to the difference between texture colors occur at boundaries between the patches in which different input images are selected.

In an embodiment, in order to remove texture stains while preventing separation between tiles from occurring, a global image reference correction value is applied to vertices present at a boundary 11 between the texture patches, as illustrated in FIG. 21.

Referring to FIG. 22, a target correction color value may be selected with reference to multiple global input images (cameras) facing an arbitrary vertex present at the boundary between the texture patches.

When one vertex is projected onto multiple input images, pixels having slightly different color values are present at the corresponding projection locations. In an embodiment, a global color target value for correcting the texture color of the corresponding vertex is calculated by averaging having the slightly different color values.

Thereafter, the current texture color value of the vertex may be calculated by projecting the vertex onto the images at the above-described step S152, after which a first texture color correction value is obtained when the calculated texture color value is subtracted from the above-described color target value.

$$\text{first texture color correction value of vertex } v = \text{color target value of } v - \text{current texture color value of } v \quad (1)$$

In Equation (1), the color target value of v is the average of projected color values of input images, and the current texture color value of v may be the projected color value of the input image selected as texture.

Figure 23:
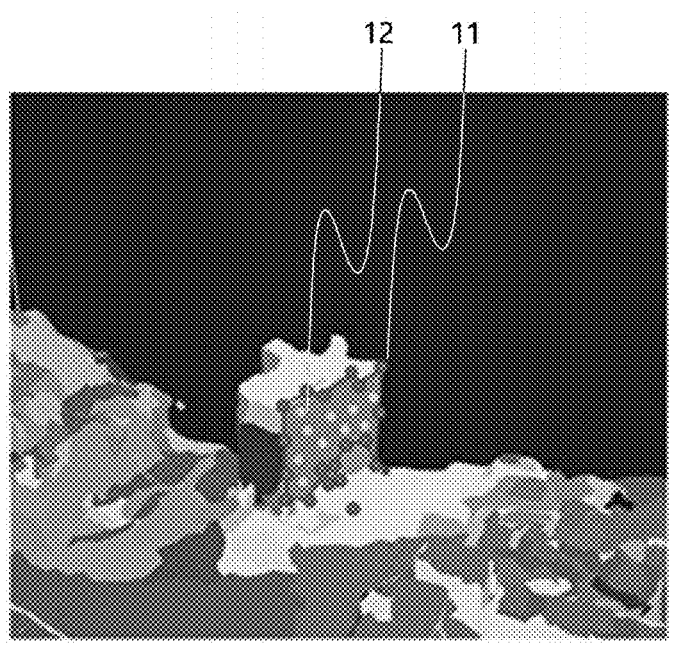
FIGS. 23 to 25 are diagrams illustrating examples of the results of calculating texture color correction values of vertices in texture and the results of correction according to an embodiment.
Figure 24:
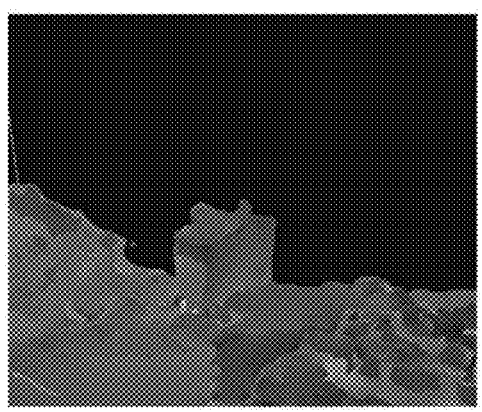
Figure 25:

FIGS. 23 to 25 are diagrams illustrating examples of the results of calculating texture color correction values of vertices in texture and the results of correction according to an embodiment.

Referring to FIG. 23, when first texture color correction values of vertices located at a patch boundary 11 are determined, the second texture color correction values of vertices located in an internal area 12 of the corresponding patch are also determined.

Referring to FIGS. 23 to 25, when the second texture color correction values of vertices located in the internal area 12 of the corresponding patch are determined by interpolating the previously calculated first texture color correction values of the vertices located at the patch boundary 11 depending on the distance, a texture map in which the tiles are smoothly connected may be generated.

The correction of texture colors according to an embodiment refers to the color target values of vertices at the patch boundary from multiple global input images, and thus the color target values of vertices at the same location are equal to each other even if the tiles are changed. Therefore, even if individual processing is performed on a tile basis, a texture map in which respective tiles are smoothly connected without causing separation may be generated.

Furthermore, the color correction values of vertices in the internal area of each patch may be obtained by interpolating the color correction values at boundary vertices, whereby a texture map in which tiles are entirely smoothly and naturally connected may be generated.

Figure 26:
FIGS. 26 to 28 are diagrams illustrating examples of the results obtained before and after the color values of textures are corrected using a method presented in the present disclosure.
Figure 27:
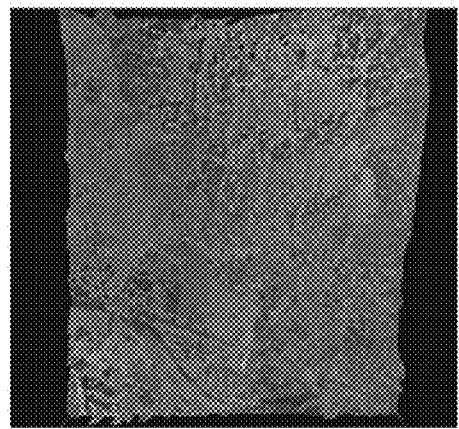
Figure 28:

FIGS. 26 to 28 are diagram illustrating examples of the results obtained before and after the color values of textures are corrected using a method presented in the present disclosure.

That is, FIG. 26 illustrates the result of texture reconstruction before texture colors are corrected, FIG. 27 illustrates the texture color correction values calculated using the above-described Equation (1), and FIG. 28 illustrates the result of correcting the texture of FIG. 26 based on the texture color correction values calculated in FIG. 27.

Figure 29:
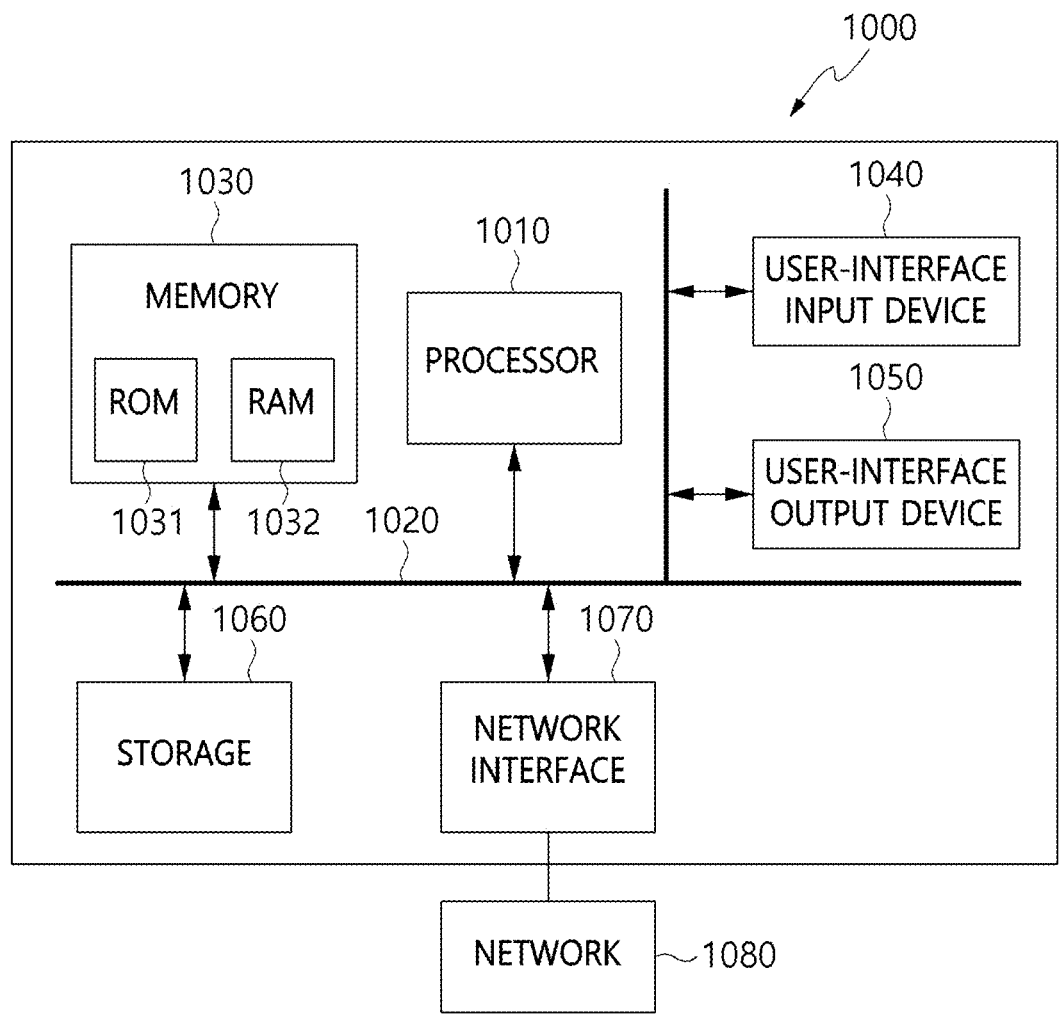
FIG. 29 is a diagram illustrating the configuration of a computer system according to an embodiment.

FIG. 29 is a diagram illustrating the configuration of a computer system according to an embodiment.

An apparatus for generating a texture map for a 3D wide area terrain according to an embodiment may be implemented in a computer system 1000, such as a computer-readable storage medium.

The apparatus for generating a texture map for a 3D wide area terrain according to an embodiment may perform the method for generating a texture map for a 3D wide area terrain, described above with reference to FIGS. 13 to 28.

The computer system 1000 may include one or more processors 1010, memory 1030, a user interface input device 1040, a user interface output device 1050, and storage 1060, which communicate with each other through a bus 1020. The computer system 1000 may further include a network interface 1070 connected to a network 1080. Each processor 1010 may be a Central Processing Unit (CPU) or a semiconductor device for executing programs or processing instructions stored in the memory 1030 or the storage 1060. Each of the memory 1030 and the storage 1060 may be a storage medium including at least one of a volatile medium, a nonvolatile medium, a removable medium, a non-removable medium, a communication medium, or an information delivery medium, or a combination thereof. For example, the memory 1030 may include Read-Only Memory (ROM) 1031 or Random Access Memory (RAM) 1032.

In accordance with embodiments, a high-quality smooth texture map may be generated without causing errors even when terrain is partitioned into tiles and mesh/texture is reconstructed and generated, thus processing large-scale wide area terrain without limitation in a reconstruction area.

In accordance with embodiments, when a wide area terrain is partitioned into tiles and mesh/texture is reconstructed and generated, visibility check errors between tiles may be prevented from occurring. That is, even if the generation of a texture map is independently processed on a tile basis, wide area information about the entire terrain is present, and thus visibility check errors may be prevented from occurring.

In accordance with embodiments, when a wide area terrain is partitioned into tiles and mesh/texture is reconstructed and generated, texture colors are corrected using a global color reference scheme even if processing is performed on a tile basis, so that the color difference between tiles does not occur, thus enabling tiles to be continuously and smoothly connected to each other. That is, because color target values for a wide area texture are determined for multiple input images, the entire texture color values may be unified even if individual processing is performed on a tile basis.

Although the embodiments of the present disclosure have been disclosed with reference to the attached drawing, those skilled in the art will appreciate that the present disclosure can be implemented in other concrete forms, without changing the technical spirit or essential features of the disclosure. Therefore, it should be understood that the foregoing embodiments are merely exemplary, rather than restrictive, in all aspects.

What is claimed is:

1. An apparatus for generating a texture map for a three-dimensional (3D) wide area terrain, comprising:
a memory configured to store at least one program; and
a processor configured to execute the program,
wherein the program is configured to perform:
acquiring input images, obtained by capturing a reconstruction target terrain at multiple views, and a camera parameter corresponding to the input images;
partitioning the reconstruction target terrain into tiles of a uniform size;
reconstructing a tile-based mesh based on information about regions corresponding to respective partitioned tiles, the input images, and the camera parameter;
generating a global depth map for each of the input images with respect to an entire mesh in which tile-based meshes are aggregated; and
reconstructing a tile-based texture map based on the input images, the camera parameter, and the global depth map.

2. The apparatus of claim 1, wherein the program is configured to further perform:
selecting an input image to be used for each tile from among the input images using the camera parameter,
wherein reconstructing the tile-based mesh is performed based on the selected input image.

3. The apparatus of claim 1, wherein the program is configured to perform:
in reconstructing the tile-based texture map, checking visibility for each face included in the tile-based mesh.

4. The apparatus of claim 3, wherein the program is configured to:
perform, in checking the visibility, determining visibility for each face using the global depth map.

5. The apparatus of claim 4, wherein the program is configured to further perform:
in checking the visibility, determining whether a ray, generated based on a camera parameter of an input image corresponding to a face included in the tile-based mesh, first intersects the corresponding face.

6. The apparatus of claim 3, wherein the program is configured to further perform:
in reconstructing the tile-based texture map, selecting an input image from which a texture segment to be mapped for each face is to be extracted.

7. The apparatus of claim 6, wherein the program is configured to further perform:
in reconstructing the tile-based texture map, correcting a difference between texture map colors of neighboring faces of the mesh, and
wherein correcting the difference between the texture map colors comprises:
determining first texture color correction values of vertices located at a boundary between texture patches; and
determining a second texture color correction value of a vertex located in an internal area of the corresponding texture patch by interpolating the first texture color correction values depending on a distance.

8. The apparatus of claim 7, wherein each of the first texture color correction values is obtained by subtracting a current texture color value of the vertex, which is a projected color value of an input image selected as texture, from a color correction target value that is an average of projected color values of the input images.

9. A method for generating a texture map for a three-dimensional (3D) wide area terrain, comprising:
acquiring input images, obtained by capturing a reconstruction target terrain at multiple views, and a camera parameter corresponding to the input images;
partitioning the reconstruction target terrain into tiles of a uniform size;
reconstructing a tile-based mesh based on information about regions corresponding to respective partitioned tiles, the input images, and the camera parameter; and
generating a global depth map for each of the input images with respect to an entire mesh in which tile-based meshes are aggregated, and
reconstructing a tile-based texture map based on the input images, the camera parameter, and the global depth map.

10. The method of claim 9, further comprising:
selecting an input image to be used for each tile from among the input images using the camera parameter,
wherein reconstructing the tile-based mesh is performed based on the selected input image.

11. The method of claim 9, wherein reconstructing the tile-based texture map comprises:
checking visibility for each face included in the tile-based mesh.

12. The method of claim 11,
wherein checking the visibility comprises:
determining visibility for each face using the global depth map.

13. The method of claim 11, wherein checking the visibility further comprises:
determining whether a ray, generated based on a camera parameter of an input image corresponding to a face included in the tile-based mesh, first intersects the corresponding face.

14. The method of claim 11, wherein reconstructing the tile-based texture map further comprises:
selecting an input image from which a texture segment to be mapped for each face is to be extracted.

15. The method of claim 14, wherein reconstructing the tile-based texture map further comprises:
correcting a difference between texture map colors of neighboring faces of the mesh, and
wherein correcting the difference between the texture map colors comprises:
determining first texture color correction values of vertices located at a boundary between texture patches; and
determining a second texture color correction value of a vertex located in an internal area of the corresponding texture patch by interpolating the first texture color correction values depending on a distance.

16. The method of claim 15, wherein each of the first texture color correction values is obtained by subtracting a current texture color value of the vertex, which is a projected color value of an input image selected as texture, from a color correction target value that is an average of projected color values of the input images.

17. A method for generating a texture map for a three-dimensional (3D) wide area terrain, comprising:
   acquiring input images, obtained by capturing a reconstruction target terrain at multiple views, and a camera parameter corresponding to the input images;
   partitioning the reconstruction target terrain into tiles of a uniform size;
   selecting an input image to be used for each tile from among the input image, using the camera parameter;
   reconstructing tile-based meshes based on information about regions corresponding to respective partitioned tiles, the selected input images, and the camera parameter;
   generating a global depth map for each of the input images based on an entire mesh in which tile-based meshes are aggregated; and
   reconstructing a tile-based texture map based on the input images, the camera parameter, the tile-based meshes, and the global depth map.

18. The method of claim 17, wherein reconstructing the tile-based texture map comprises:
   checking visibility for each face included in the tile-based mesh;
   reconstructing the tile-based texture map, selecting an input image from which a texture segment to be mapped for each face is to be extracted; and
   correcting a difference between texture map colors of neighboring faces of the mesh.

19. The method of claim 18, wherein checking the visibility comprises at least one of:
   determining visibility for each face using the global depth map; or
   determining whether a ray, generated based on a camera parameter of an input image corresponding to a face included in the tile-based mesh, first intersects the corresponding face; or
   a combination thereof.

20. The method of claim 19, wherein correcting the difference between the texture map colors comprises:
   determining first texture color correction values of vertices located at a boundary between texture patches; and
   determining a second texture color correction value of a vertex located in an internal area of the corresponding texture patch by interpolating the first texture color correction values depending on a distance,
   wherein each of the first texture color correction values is obtained by subtracting a current texture color value of the vertex, which is a projected color value of an input image selected as texture, from a color correction target value that is an average of projected color values of the input images.

* * * * *